US012204259B2

(12) United States Patent
Fukaya et al.

(10) Patent No.: US 12,204,259 B2
(45) Date of Patent: Jan. 21, 2025

(54) FIXING LIQUID

(71) Applicant: BROTHER KOGYO KABUSHIKI KAISHA, Nagoya (JP)

(72) Inventors: Hideji Fukaya, Aichi (JP); Takayuki Higuchi, Anpachi (JP); Tatsuya Ezaka, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 529 days.

(21) Appl. No.: 17/621,942

(22) PCT Filed: Oct. 31, 2019

(86) PCT No.: PCT/JP2019/042793
§ 371 (c)(1),
(2) Date: Dec. 22, 2021

(87) PCT Pub. No.: WO2021/009937
PCT Pub. Date: Jan. 21, 2021

(65) Prior Publication Data

US 2022/0260935 A1 Aug. 18, 2022

(30) Foreign Application Priority Data

Jul. 17, 2019 (JP) ................................ 2019-132311

(51) Int. Cl.
*G03G 11/00* (2006.01)
*G03G 15/20* (2006.01)

(52) U.S. Cl.
CPC ......... *G03G 11/00* (2013.01); *G03G 15/2096* (2013.01)

(58) Field of Classification Search
CPC .............................. G03G 11/00; G03G 15/20
See application file for complete search history.

(56) References Cited

U.S. PATENT DOCUMENTS

| | | | |
|---|---|---|---|
| 5,666,628 | A | 9/1997 | Fukai |
| 7,517,845 | B2 | 4/2009 | Dournel et al. |
| 2003/0022080 | A1 | 1/2003 | Fushimi et al. |
| 2006/0115762 | A1 | 6/2006 | Katano et al. |
| 2006/0133863 | A1 | 6/2006 | Asakura et al. |

(Continued)

FOREIGN PATENT DOCUMENTS

| | | |
|---|---|---|
| CN | 1381771 A | 11/2002 |
| CN | 1790183 A | 6/2006 |

(Continued)

OTHER PUBLICATIONS

Japan Patent Office, International Search Report issued in International Application No. PCT/JP2019/042793, mailed Jan. 7, 2020.

(Continued)

*Primary Examiner* — Stewart A Fraser
(74) *Attorney, Agent, or Firm* — Baker Botts L.L.P.

(57) ABSTRACT

There is provided a fixing solution capable of improving fixing property while suppressing odor. The fixing solution includes: an aliphatic dicarboxylic acid ester; a polyethylene glycol alkyl ether; and water. The water is dispersed in the aliphatic dicarboxylic acid ester. The polyethylene glycol alkyl ether has not less than 4 pieces and not more than 12 pieces of an oxyethylene unit.

19 Claims, 2 Drawing Sheets

1

(56) References Cited

U.S. PATENT DOCUMENTS

| | | | | |
|---|---|---|---|---|
| 2009/0003903 | A1 | 1/2009 | Katano et al. | |
| 2011/0002718 | A1 * | 1/2011 | Katano | G03G 11/00 399/340 |
| 2012/0135342 | A1 * | 5/2012 | Katano | G03G 15/2096 430/124.21 |
| 2020/0310272 | A1 | 10/2020 | Higuchi et al. | |

FOREIGN PATENT DOCUMENTS

| | | | |
|---|---|---|---|
| CN | 101334621 | A | 12/2008 |
| CN | 101943879 | A | 1/2011 |
| EP | 0 636 946 | A1 | 2/1995 |
| EP | 2 009 515 | A2 | 12/2008 |
| EP | 2270604 | A1 | 1/2011 |
| JP | S61-025136 | A | 2/1986 |
| JP | H07-044034 | A | 2/1995 |
| JP | 2006-133306 | A | 5/2006 |
| JP | 2006-195429 | A | 7/2006 |
| JP | 2007-017611 | A | 1/2007 |
| JP | 2011-033940 | A | 2/2011 |
| WO | 2019/124432 | A1 | 6/2019 |
| WO | 2019/138859 | A1 | 7/2019 |

OTHER PUBLICATIONS

International Preliminary Report on Patentability (Chapter I) and Written Opinion of International Application No. PCT/JP2019/042793, with English translation attached. (Jan. 18, 2022).

China National Intellectual Property Administration, First Office Action issued in Chinese Patent Application No. 201980097593.9, dated Dec. 15, 2023 (12 pages).

European Patent Office, Extended European Search Report issued in European Patent Application No. 19937699.7, mailed Jun. 23, 2023.

* cited by examiner

FIXING LIQUID

CROSS-REFERENCE TO RELATED APPLICATIONS

This application is a U.S. National Stage Patent Application under 35 U.S.C. § 371 of International Patent Application No. PCT/JP2019/042793, filed on Oct. 31, 2019, which claims the benefit of Japanese Patent Application No. 2019-132311, filed on Jul. 17, 2019, the disclosures of each of which are incorporated herein by reference in their entirety.

TECHNICAL FIELD

The present disclosure relates to a fixing solution.

BACKGROUND ART

There is a conventionally known image forming apparatus which uses a fixing solution so as to fix a toner. The fixing solution includes an aliphatic dicarboxylic acid ester capable of softening the toner, and a water as a solvent. The aliphatic dicarboxylic acid ester is made to be solubilized in water (see Patent Literature 1 indicated below).

CITATION LIST

Patent Literature

Patent Literature 1: Japanese Patent Application Laid-Open No. JP2007-017611

SUMMARY

Problem to be Solved by the Invention

In the fixing solution described in Patent Literature 1 as described above, however, since the aliphatic dicarboxylic acid ester is solubilized in water, it is difficult to cause the fixing solution to contain the aliphatic dicarboxylic acid ester in not less than a ratio by which the aliphatic dicarboxylic acid is soluble in water.

Accordingly, it is difficult to blend, to the fixing solution, the aliphatic dicarboxylic acid ester in an amount sufficient for softening the toner, which in turn leads to such a case that the fixing property is not satisfactory.

Further, in a case that the aliphatic dicarboxylic acid ester is blended in the fixing solution, in not less than the ratio by which the aliphatic dicarboxylic acid ester is soluble in water, in order to secure the fixing property, there is such a possibility that any odor is excessively generated.

An object of the present disclosure is to provide a fixing solution capable of improving the fixing property while suppressing the odor.

Solution to the Problem (1) A fixing solution of the present disclosure includes: an aliphatic dicarboxylic acid ester; a polyethylene glycol alkyl ether; and water. The water is dispersed in the aliphatic dicarboxylic acid ester.

The polyethylene glycol alkyl ether has not less than 4 pieces and not more than 12 pieces of an oxyethylene unit.

(2) The water may be solubilized in the aliphatic dicarboxylic acid ester by the polyethylene glycol alkyl ether.

(3) A number of a carbon atom of an alkyl group of the polyethylene glycol alkyl ether may be not less than 1 and may be not more than 4.

(4) The aliphatic dicarboxylic acid ester may be represented by a general formula: $R^1(—COO—R^2)_2$ (in the general formula, $R^1$ being an alkylene group having 1 to 8 carbon atoms and $R^2$ being an alkyl group having 2 to 10 carbon atoms).

(5) A ratio of the water in the fixing solution may be not more than 10% by mass.

(6) The ratio of the water in the fixing solution may be not less than 0.1% by mass and may be not more than 10% by mass.

(7) The ratio of the water in the fixing solution may be not less than 2% by mass and may be not more than 8% by mass.

(8) A ratio of the aliphatic dicarboxylic acid ester in the fixing solution may be not less than 10% by mass and may be not more than 90% by mass.

(9) A mass ratio of the polyethylene glycol alkyl ether to the aliphatic dicarboxylic acid ester may be not less than 9.4/90 and may be not more than 87/10.

(10) The mass ratio of the polyethylene glycol alkyl ether to the aliphatic dicarboxylic acid ester may be not less than 27/70 and may be not more than 77/20.

(11) The fixing solution may include an ionization accelerator. The ionization accelerator promotes ionization of the fixing solution.

(12) The ionization accelerator may be an ionic surfactant.

(13) The ionic surfactant may be an anionic surfactant.

(14) The anionic surfactant may be a sulfuric acid ester salt.

(15) The sulfuric acid ester salt may be a sodium polyoxyethylene alkyl ether sulfate.

(16) The anionic surfactant may be a sulfonic acid salt.

(17) The ionic surfactant may be a cationic surfactant.

(18) The cationic surfactant may be an ammonium salt.

(19) The ionic surfactant may be an amphoteric surfactant.

(20) The amphoteric surfactant may be of a betaine type.

(21) The fixing solution may be used in a fixing apparatus of an electrostatic spraying system.

Effect of the Invention

According to the fixing solution of the present disclosure, the water is dispersed in the aliphatic dicarboxylic acid ester by the polyethylene glycol alkyl ether having not less than 4 pieces and not more than 12 pieces of the oxyethylene unit.

Accordingly, it is possible to blend, in the fixing solution, the aliphatic dicarboxylic acid ester in the amount sufficient for softening the toner to thereby improve the fixing property, while suppressing the odor.

DESCRIPTION OF EMBODIMENT

1. Outline of Image Forming Apparatus 1

Figure 1:
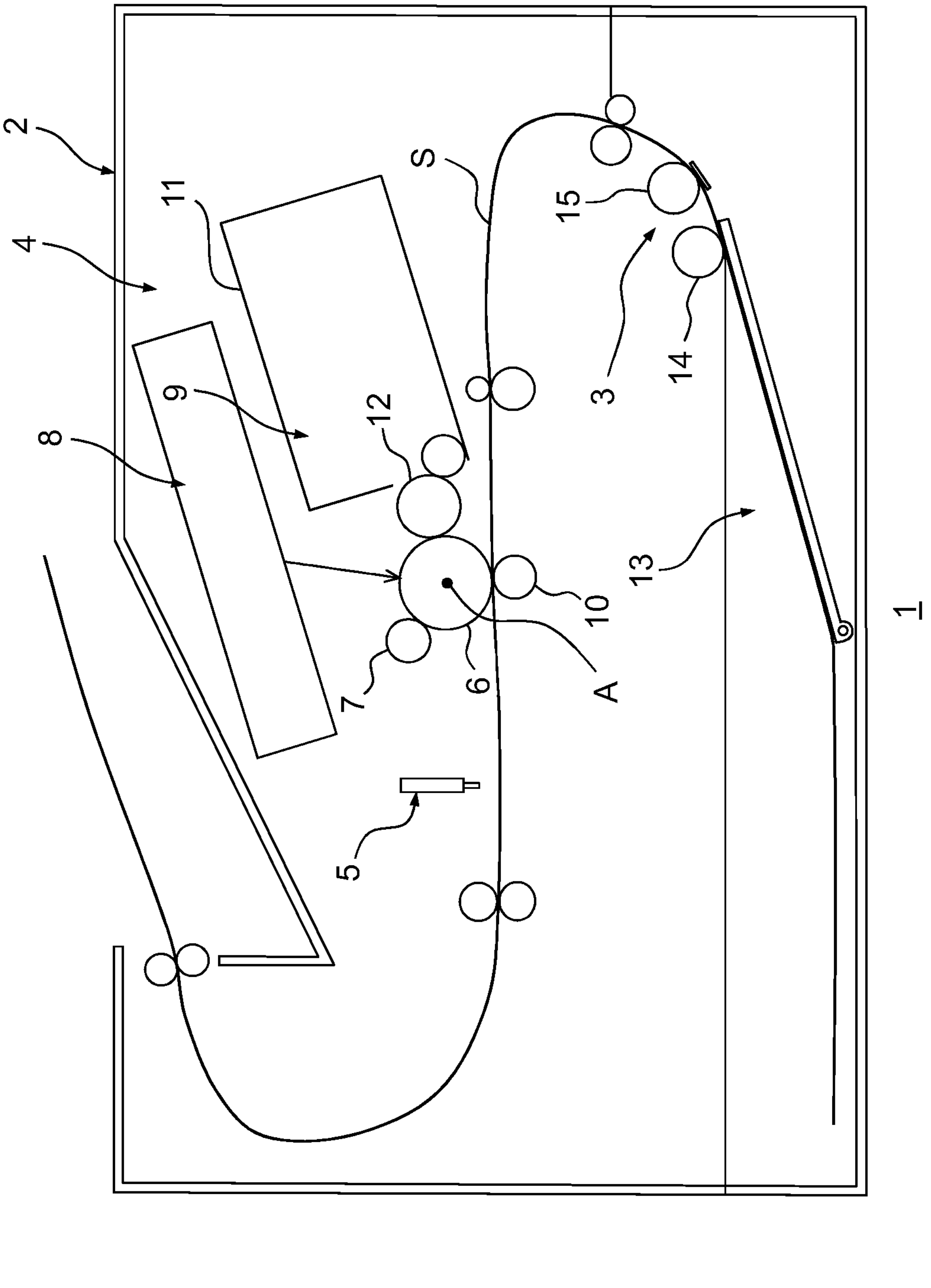
FIG. 1 is a schematic view of the configuration of an image forming apparatus.

The outline of an image forming apparatus 1 will be explained, with reference to FIG. 1.

The image forming apparatus 1 includes a casing 2, a sheet feeding part 3, a toner image forming part 4, and a fixing device 5.

1.1: Casing 2

The casing 2 constructs the exterior of the image forming apparatus 1. The casing 2 accommodates the sheet feeding part 3, the toner image forming part 4, and the fixing device 5.

1.2: Sheet Feeding Part 3

The sheet feeding part 3 supplies or feeds a sheet S to the toner image forming part 4. The sheet feeding part 3 includes a sheet cassette 13, a pick-up roller 14 and a conveying roller 15. The sheet cassette 13 is capable of accommodating the sheet S therein. The sheet S is, for example, printing paper (printing paper sheet). The pick-up roller 14 picks up the sheet S in the sheet cassette 13. The pick-up roller 14 conveys the sheet S which has been picked up toward the conveying roller 15. The conveying roller 15 conveys the sheet S from the pick-up roller 14 toward a photosensitive drum 6.

1.3: Toner Image Forming Part 4

The toner image forming part 4 uses a toner to form a toner image in the sheet S. The toner image forming part 4 is provided with the photosensitive drum 6, a charger 7, an exposure device 8, a developing device 9, and a transfer device 10.

1.3.1: Photosensitive Drum 6

The photosensitive drum 6 is rotatable about an axial line A. The photosensitive drum 6 extends along the axial line A. The photosensitive drum 6 has a cylindrical shape.

1.3.2: Charger 7

The charger 7 charges a surface of the photosensitive drum 6. Specifically, the charger 7 is a charging roller. Note that the charger 7 may be a scorotoron type charging device. In a case that the charger 7 is the charging roller, the charger 7 makes contact with the surface of the photosensitive drum 6. In a case that the charger 7 is the scorotoron type charging device, the charger 7 is positioned to have a spacing distance with respect to the surface of the photosensitive drum 6.

1.3.3: Exposure Device 8

The exposure device 8 is capable of exposing the surface of the photosensitive drum 6. The exposure device 8 exposes the surface of the photosensitive drum 6 in a state that the surface of the photosensitive drum is charged by the charger 7, thereby forming an electrostatic latent image on the surface of the photosensitive drum 6. Specifically, the exposure device 8 is a laser scan unit. Note that the exposure device 8 may be an LED array.

1.3.4: Developing Device 9

The developing device 9 is capable of supplying the toner to the surface of the photosensitive drum 6. The developing device 9 supplies the toner to the surface of the photosensitive drum 9, thereby developing the electrostatic latent image and forming a toner image on the surface of the photosensitive drum 6. The developing device 9 has a toner accommodating part 11 and a developing roller 12.

The toner accommodating part 11 accommodates the toner. The toner includes toner particles, and includes, as necessary, an external additive. The toner particles contain a binder resin, and contain, as necessary, a colorant, a pigment dispersant, a mold releasing agent, a magnetic body and an electrostatic charge controlling agent. The binder resin is the base of the toner particles. The binder resin binds components contained in the toner particles. The binder resin is softened by the application of a fixing solution thereto: then, the binder resin is cured to be fixed (firmly adhered) to the sheet S. The fixing solution will be described later on. The colorant imparts a desired color to the toner particles. The colorant is dispersed in the binder resin. The pigment dispersant improves the dispersibility of the colorant. The electrostatic charge controlling agent imparts the electrostatic property to the toner particles. The electrostatic property may be either the positive electrostatic property or the negative electrostatic property. The external additive adjusts the electrostatic property, the fluidity, the storage stability of the toner particles.

The developing roller 12 is capable of supplying the toner in the inside of the toner accommodating part 11 to the surface of the photosensitive drum 6. The developing roller 12 makes contact with the photosensitive drum 6. Note that it is allowable that the developing roller 12 does not make contact with the photosensitive drum 6.

The developing device 9 may be configured as one process unit, together with the photosensitive drum 6 and the charger 7. The process unit may be attachable with respect to the casing 2.

Further, the developing device 9 may also be a developing cartridge. The developing cartridge is attachable with respect to a drum unit. The drum unit has the photosensitive drum 6 and the charger 7. The drum unit may be attachable with respect to the casing 2.

The developing device 9 may also be provided with: a developer including the developing roller 12; and a toner cartridge attachable with respect to the developer. In such a case, the toner cartridge is provided with the toner accommodating part 11. Further, the developer may be provided on the drum unit. The developer may be attachable with respect to the drum unit.

1.3.5: Transfer Device 10

The transfer device 10 is capable of transferring the toner image from the photosensitive drum 6 to the sheet S. The transfer device 10 makes contact with the photosensitive drum 6. Note that it is allowable that the transfer device 10 does not make contact with the photosensitive drum 6. Specifically, the transfer device 10 is a transfer roller. Note that the transfer device 10 may be a transfer belt.

1.4: Fixing Device

The fixing device 5 applies the fixing solution to the toner image transferred to the sheet S by the transfer device 10, and fixes the toner image to the sheet S. The fixing device 5 is of an electrostatic spraying system. Specifically, the fixing device 5 sprays the fixing solution which is ionized toward the toner image on the sheet S by the electrostatic spraying to thereby apply the fixing solution to the toner image. Note that the fixing device 5 may be a fixing roller to which the fixing solution is applied or coated. In such a case, the fixing roller makes contact with the toner image so as to apply the fixing solution to the toner image. The sheet S to which the toner image is fixed is discharged onto the upper surface of the casing 2.

2. Details of Fixing Solution

Next, the fixing solution will be explained.

The fixing solution is used in the above-described fixing device 5. The fixing solution contains an aliphatic dicarboxylic acid ester; a polyethylene glycol alkyl ether; water; and an ionization accelerator.

2.1: Aliphatic Dicarboxylic Acid Ester

The aliphatic dicarboxylic acid ester is capable of softening the toner.

The aliphatic dicarboxylic acid ester is specifically exemplified by: diethyl succinate, diethyl adipate, diisobutyl adipate, dioctyl adipate, diethyl sebacate, dibutyl sebacate, dioctyl sebacate, and diethyl dodecanedioate, and the like.

The aliphatic dicarboxylic acid ester is preferably an aliphatic dicarboxylic acid ester represented by the following general formula.

General formula: $R^1(—COO—R^2)_2$ (in the general formula, $R^1$ is an alkylene group having 1 to 8 carbon atom(s), and $R^2$ is an alkyl group having 2 to 10 carbon atoms).

The aliphatic dicarboxylic acid ester represented by the above-described general formula is exemplified specifically by: diethyl succinate, diethyl adipate, diisobutyl adipate, dioctyl adipate, diethyl sebacate, dibutyl sebacate, dioctyl sebacate, and the like.

A ratio of the aliphatic dicarboxylic acid ester in the fixing solution is, for example, not less than 10% by mass. In a case that the ratio of the aliphatic dicarboxylic acid ester in the fixing solution is not less than 10% by mass, it is possible to soften the toner. Accordingly, it is possible to secure the fixing property of the toner image with respect to the sheet S. The fixing property will be explained in Examples which will be described later on. The ratio of the aliphatic dicarboxylic acid ester in the fixing solution may be not less than 20% by mass. In a case that the ratio of the aliphatic dicarboxylic acid ester in the fixing solution is not less than 20% by mass, it is possible to improve the fixing property of the toner image with respect to the sheet S.

Further, the ratio of the aliphatic dicarboxylic acid ester in the fixing solution is, for example, not more than 90% by mass. In a case that the ratio of the aliphatic dicarboxylic acid ester in the fixing solution is not more than 90% by mass, it is possible to secure the amount of the polyethylene glycol alkyl ether and the amount of the ionization accelerator in the fixing solution. This makes it possible to solubilize the water in the aliphatic dicarboxylic acid ester, and to secure the fixing property of the toner image with respect to the sheet S. Further, it is possible to secure the amount of water in the fixing solution, and to secure the sprayability of the fixing solution with respect to the sheet S. The sprayability will be explained in Examples which will be described later on. The ratio of the aliphatic dicarboxylic acid ester in the fixing solution may be not more than 70% by mass. In a case that the ratio of the aliphatic dicarboxylic acid ester in the fixing solution is not more than 70% by mass, it is possible to improve the fixing property of the toner image with respect to the sheet S and to improve the sprayability of the fixing solution with respect to the sheet S.

2.2: Polyethylene Glycol Alkyl Ether

The polyethylene glycol alkyl ether disperses the water in the aliphatic dicarboxylic acid ester. Specifically, the polyethylene glycol alkyl ether solubilizes the water in the aliphatic dicarboxylic acid ester. Note that a state that the water is solubilized in the aliphatic dicarboxylic acid ester is a state that the water is dispersed in the aliphatic dicarboxylic acid ester in a size of a several nano-order to a several micron order, and that the fixing solution appears to be a transparent and uniform solution in a case that the fixing solution is visually observed.

For example, the polyethylene glycol alkyl ether is exemplified by a polyethylene glycol monoalkyl ether and a polyethylene glycol dialkyl ether.

The number of the carbon atom of an alkyl group of the polyethylene glycol alkyl ether is, for example, not less than 1 (one).

The number of the carbon atom of the alkyl group of the polyethylene glycol alkyl ether is, for example, not more than 4. In a case that the number of the carbon atom of the alkyl group of the polyethylene glycol alkyl ether is not less than 1 (one) and/or is not more than 4, it is possible to solubilize the water in the aliphatic dicarboxylic acid ester.

The polyethylene glycol monoalkyl ether in which the number of the carbon atom of the alkyl group is not less than 1 and not more than 4 is exemplified, for example, by: polyethylene glycol monomethyl ether, polyethylene glycol monoethyl ether, polyethylene glycol monopropyl ether and polyethylene glycol monobutyl ether.

The polyethylene glycol dialkyl ether in which the number of the carbon atom of the alkyl group is not less than 1 and not more than 4 is exemplified, for example, by: polyethylene glycol dimethyl ether, polyethylene glycol diethyl ether, polyethylene glycol dipropyl ether and polyethylene glycol dibutyl ether.

The polyethylene glycol alkyl ether has not less than 4 pieces of the oxyethylene unit. In a case that the polyethylene glycol alkyl ether has not less than 4 pieces of the oxyethylene unit, it is possible to improve the evaporation storage stability of the fixing solution. Further, in a case that the polyethylene glycol alkyl ether has not less than 4 pieces of the oxyethylene unit, it is possible to lower the odor of the fixing solution. The evaporation and storage stability and the odor will be explained in Examples which will be described later on.

The polyethylene glycol alkyl ether has not more than 12 pieces of the oxyethylene unit. In a case that the polyethylene glycol alkyl ether has not more than 12 pieces of the oxyethylene unit, it is possible to solubilize the water in the aliphatic dicarboxylic acid ester.

The ratio of the polyethylene glycol alkyl ether in the fixing solution is, for example, not less than 5% by mass. The ratio of the polyethylene glycol alkyl ether in the fixing solution may be not less than 7% by mass. The ratio of the polyethylene glycol alkyl ether in the fixing solution is, for example, not more than 90% by mass.

A mass ratio of the polyethylene glycol alkyl ether to the aliphatic dicarboxylic acid ester (the mass of polyethylene glycol alkyl ether/the mass of aliphatic dicarboxylic acid ester) is, for example, not less than 9.4/90. In a case that the mass ratio of the polyethylene glycol alkyl ether to the aliphatic dicarboxylic acid ester is not less than 9.4/90, it is possible to solubilize the water in the aliphatic dicarboxylic acid ester. The mass ratio of the polyethylene glycol alkyl ether to the aliphatic dicarboxylic acid ester may be not less than 27/70. In a case that the mass ratio of the polyethylene glycol alkyl ether to the aliphatic dicarboxylic acid ester is not less than 27/70, it is possible to further solubilize the water in the aliphatic dicarboxylic acid ester.

The mass ratio of the polyethylene glycol alkyl ether to the aliphatic dicarboxylic acid ester is, for example, not more than 87/10. In a case that the mass ratio of the polyethylene glycol alkyl ether to the aliphatic dicarboxylic acid ester is not more than 87/10, it is possible to solubilize the water in the aliphatic dicarboxylic acid ester.

The mass ratio of the polyethylene glycol alkyl ether to the aliphatic dicarboxylic acid ester may be not more than 77/20. In a case that the mass ratio of the polyethylene glycol alkyl ether to the aliphatic dicarboxylic acid ester is not more than 77/20, it is possible to improve the fixing property.

2.3: Water

The water ionizes, together with the ionization accelerator, the fixing solution. The water is dispersed in the aliphatic dicarboxylic acid ester. Specifically, the water is solubilized in the aliphatic dicarboxylic acid ester by the polyethylene glycol alkyl ether.

The ratio of the water in the fixing solution is smaller than the ratio of the aliphatic dicarboxylic acid ester in the fixing solution.

The ratio of the water in the fixing solution is, for example, not less than 0.1% by mass. In a case that the ratio of the water in the fixing solution is not less than 0.1% by mass, it is possible to secure the sprayability of the fixing solution with respect to the sheet S. The ratio of the water in the fixing solution may be not less than 2% by mass. In a case that the ratio of the water in the fixing solution is not less than 2% by mass, it is possible to improve the sprayability of the fixing solution with respect to the sheet S.

The ratio of the water in the fixing solution is, for example, not more than 10% by mass. In a case that the content ratio of the water in the fixing solution is not more than 10% by mass, it is possible to solubilize the water in the aliphatic dicarboxylic acid ester. The ratio of the water in the fixing solution may be not more than 8% by mass. In a case that the ratio of the water in the fixing solution is not more than 8% by mass, it is possible to further solubilize the water in the aliphatic dicarboxylic acid ester.

2.4: Ionization Accelerator

The ionization accelerator promotes the ionization of the fixing solution. Specifically, the ionization accelerator is ionized by being dissolved in the water in the fixing solution. With this, the ionization accelerator promotes the ionization of the fixing solution as a whole. The ionization accelerator is an ionic surfactant.

The ionic surfactant is an anionic surfactant, a cationic surfactant, or an amphoteric surfactant.

The anionic surfactant is exemplified by: for example, a carboxylic acid salt; for example, a sulfuric acid ester salt such as an alkyl sulfuric acid ester salt, polyoxyethylene alkyl ether sulfuric acid ester salt, etc.; for example, a sulfonic acid salt such as an alkyl diphenyl ether disulfonic acid salt, an alkylbenzene sulfonic acid salt, an α-olefine sulfonic acid salt, etc.; for example, a sulfosuccinic acid salt; and the like.

The cationic surfactant is exemplified, for example, by a quaternary ammonium salt.

The amphoteric surfactant is exemplified, for example, by an amphoteric surfactant of a betaine type.

It is preferred that the ionic surfactant is the sulfuric acid ester salt. It is more preferred that the ionic surfactant is a sodium polyoxyethylene alkyl ether sulfate.

A ratio of the ionization accelerator in the fixing solution is, for example, not less than 0.01% by mass. The ratio of the ionization accelerator in the fixing solution may be not less than 0.05% by mass. The ratio of the ionization accelerator in the fixing solution is, for example, not more than 1% by mass.

A mass ratio of the ionization accelerator with respect to the water (the mass of the ionization accelerator/the mass of the water) is, for example, not less than 1/70. The mass ratio of the ionization accelerator to the water may be not less than 1/50. The mass ratio of the ionization accelerator to the water is, for example, not more than 2/1. The mass ratio of the ionization accelerator to the water may be, for example, not more than 1/2.

3. Effects

According to the fixing solution, the water is dispersed in the aliphatic dicarboxylic acid ester by the polyethylene glycol alkyl ether having not less than 4 pieces and not more than 12 pieces of the oxyethylene unit.

Accordingly, it is possible to blend the aliphatic dicarboxylic acid ester in the amount sufficient for softening the toner, while suppressing the odor, thereby making it possible to improve the fixing property.

4. Modifications

Although the development system of the above-described embodiment is the one-component development system using only the toner, the present invention is not limited to or restricted by the above-described embodiment.

The developing system may be, for example, the two-component development system in which a toner and a carrier are mixed. In a case that the developing system is the two-component developing system, the carrier is exemplified, for example, by an alloy of a metal such as iron, ferrite, magnetite, etc., and a metal such as aluminum, lead, etc.

The carrier particle size is, for example, not less than 4 μm, preferably not less than 20 μm, for example, not more than 200 μm, preferably not more than 150 μm.

The blending ratio of the toner, with respect to 100 parts by mass of the carrier, is, for example, not less than 1 part by mass, preferably is not less than 2 parts by mass, for example, not more than 200 parts by mass, preferably not more than 50 parts by mass.

The carrier may be a resin-coated carrier, a dispersion type carrier in which the magnetic powder is dispersed in the binder resin, etc.

EXAMPLES

Next, the present invention will be explained based on Examples and Comparative Examples. Note that, however, the present invention is not limited by or restricted to the following examples.

1. Preparation of Fixing Solution

The aliphatic dicarboxylic acid ester, a solubilizing agent, the ionization accelerator and the water were mixed in blending ratios indicated in TABLE 1 to TABLE 6, and thus a fixing solution of each of the respective Examples and Comparative Examples was obtained.

2. Evaluation of Fixing Solution 2.1: Solubilization

The obtained fixing solution was visually observed, and was evaluated in accordance with the following criteria for evaluation. Note that a fixing solution which was evaluated as "NG" in the evaluation of the solubilization was determined as not usable in an image forming apparatus, and the evaluations of the fixing property, etc., were not performed therefor. The results are indicated in TABLE 1 to TABLE 6.

VG (very good): The fixing solution was uniform (there was no change such as separation, sedimentation, cloudiness, etc.) after placing the fixing solution for one week in a thermostatic bath at the temperature of 30° C.

G (good): The fixing solution was uniform after placing the fixing solution for one week in a thermostatic bath at the normal temperature (25° C.).

NG (no good): The fixing solution was non-uniform (there were/was separation and/or the sedimentation).

2.2: Fixing Property

A toner image was formed on one surface of a sheet, by using an image forming apparatus from which a thermal fixing device was removed. Since the thermal fixing device was removed, the toner image was not fixed to the first sheet.

Next, the fixing solution was sprayed to the toner image on the sheet, by using a spray.

Then, after elapse of one day since the spraying of the fixing solution, a surface of the toner image was rubbed by using a cotton swab, and an extent of adhesion of the toner with respect to the cotton swab was evaluated in accordance with the following criterion for evaluation. The results are indicated in TABLE 1 to TABLE 6.

VG (very good): Any adhesion of the toner was not observed, even in a case that the surface of the cotton swab was observed by a microscope.

G (good): Any adhesion of the toner was not observed in a case that a surface of the cotton swab was visually observed. However, adhesion of the toner was observed in a case that the surface of the cotton swab was observed by a microscope.

NG (no good): Adhesion of the toner was observed in a case that the surface of the cotton swab was observed visually.

2.3: Paper Curl

The fixing solution was sprayed to the toner image on the sheet, in a similar manner as in the evaluation of the fixing property. After elapse of one day, the sheet was placed on a level stand, and an extent by which the sheet was curled was evaluated in accordance with the following criterion for evaluation. The results are indicated in TABLE 1 to TABLE 6.

G (good): A distance from an end part, of the sheet, farthest from the stand and a surface of the stand was less than 10 mm.

NG (no good): The distance from the end part, of the sheet, farthest from the stand and the surface of the stand was not less than 10 mm.

2.4: Evaporation and Storage Stability

The obtained fixing solution was placed in a container, and was placed in a thermostatic bath at the temperature of 50° C., in a state that the container was open. After elapse of one day, the state of the fixing solution was observed, and was evaluated in accordance with the following criterion for evaluation. The results are indicated in TABLE 1 to TABLE 6.

G (good): The fixing solution was uniform.

NG (no good): The fixing solution was non-uniform, or was solidified due to drying.

2.5: Odor

A sensory evaluation was performed as to whether or not there was an odor at the room temperature (25° C.). The results are indicated in TABLE 1 to TABLE 6.

G (good): There was no odor

NG (no good): There was an odor.

2.6: Overall Evaluation

The fixing solution was evaluated as to whether the fixing solution was usable in the image forming apparatus, in accordance with the following criterion for evaluation. The results are indicated in TABLE 1 to TABLE 6.

G (good): All the evaluations of the solubilization, the fixing property, the paper curl, the evaporation and storage stability and the odor were either "VG" or "G".

NG (no good): At least one of the evaluations of the solubilization, the fixing property, the paper curl, the evaporation and storage stability and the odor was "NG".

3. Evaluation of Sprayability

Figure 2:
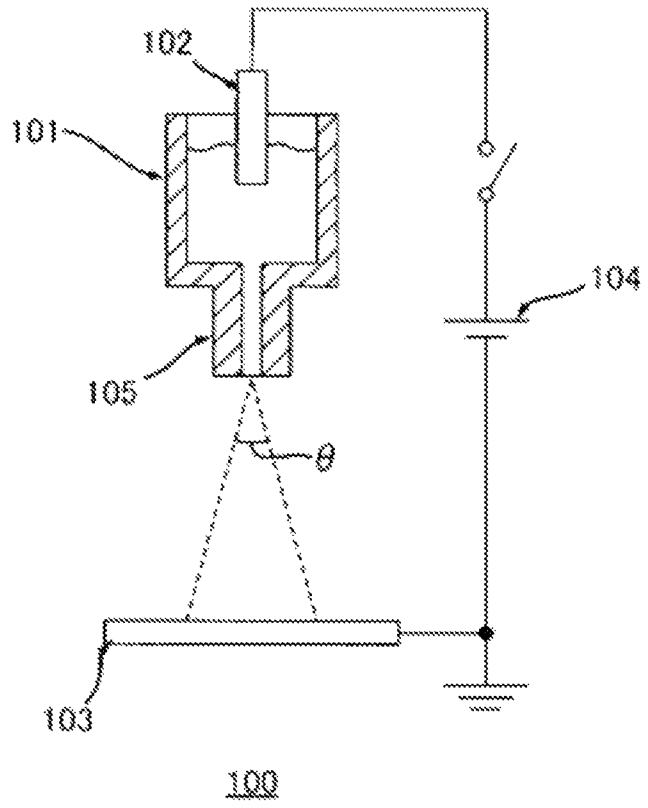
FIG. 2 is a schematic view of the configuration of a spraying evaluation apparatus.

A spraying evaluation apparatus 100 as depicted in FIG. 2 was used to observe a spraying state (sprayability) of the fixing solution, and a spraying state (continuous sprayability) of the fixing solution in a case of spraying the fixing solution continuously for 10 minutes, and evaluations were performed in accordance with the following criterion for evaluation. The results are indicated in TABLE 1 to TABLE 6.

Note that the spraying evaluation apparatus 100 is provided with a tank 101, a first electrode 102, a second electrode 103, a power source 104 and a nozzle 105. The tank 101 accommodates the fixing solution. The first electrode 102 makes contact with the fixing solution in the tank 101. The second electrode 103 is positioned to be separated from the first electrode 102. The power source 104 is electrically connected to the first electrode 102 and the second electrode 103. The power source 104 generates a difference in voltage between the first electrode 102 and the second electrode 103. The nozzle 105 is positioned between the first electrode 102 and the second electrode 103. The nozzle 105 discharges the fixing solution in the tank 101. Specifically, the fixing solution in the tank 101 is charged by the first electrode 102. The charged fixing solution is atomized in a case that the fixing solution passes through a forward end of the nozzle 15. In this situation, an angle by which the atomized fixing solution expands is defined as a spraying angle θ.

3.1: Sprayability

VG (very good): The spraying angle θ is not less than 100°.

G (good): The spraying angle θ is not less than 60° and less than 100°.

NG (no good) The spraying angle θ is less than 60°.

3.2: Continuous Sprayability

VG (very good): The change in the spraying angle θ is less than 5°.

G (good): The change in the spraying angle θ is not less than 5° and less than 10°.

NG (no good) The change in the spraying angle θ is not less than 10°.

TABLE 1 to TABLE 6 (Following)—LEGEND

EX. means Example.

COM. EX. means Comparative Example.

*1: SUNNOL is a registered trade mark of LION SPECIALTY CHEMICALS CO., LTD.; sulfuric acid ester salt; effective ingredient amount: 30%

*2: PELEX is a registered trade mark of KAO CORPORATION; sulfonic acid salt; effective ingredient amount: 70%

*3: CATIOGEN is a registered trade mark of DKS CO., LTD. (DAI-ICHI KOGYO SEIYAKU CO., LTD.); ammonium salt; effective ingredient amount: 30%

*4: ENAGICOL is a registered trade mark of LION SPECIALTY CHEMICALS CO., LTD.; betaine; effective ingredient amount: 30%

TABLE 1

| | | Number of carbon atoms of $R^1$ | Number of carbon atoms of $R^2$ | EX. 1 | EX. 2 | EX. 3 | COM. EX. 1 | COM. EX. 2 | COM. EX. 3 |
|---|---|---|---|---|---|---|---|---|---|
| Aliphatic dicarboxylic acid ester (part by mass) | diethyl sebacate | 8 | 2 | 40.0 | 40.0 | 40.0 | 40.0 | 40.0 | 40.0 |
| | dibutyl sebacate | 8 | 4 | | | | | | |
| | dioctyl sebacate | 8 | 8 | | | | | | |
| | diethyl adipate | 4 | 2 | | | | | | |
| | diisobutyl adipate | 4 | 4 | | | | | | |
| | diethyl succinate | 2 | 2 | | | | | | |

TABLE 1-continued

| | | Number of carbon atoms of $R^1$ | Number of carbon atoms of $R^2$ | EX. 1 | EX. 2 | EX. 3 | COM. EX. 1 | COM. EX. 2 | COM. EX. 3 |
|---|---|---|---|---|---|---|---|---|---|
| Solubilizing agent (part by mass) | | Number of oxyalkylene unit | | | | | | | |
| | triethylene glycol monomethyl ether | 3 | | | | | 57.0 | | |
| | polyethylene glycol monomethyl ether | 4 | | 57.0 | | | | | |
| | | 8 | | | 57.0 | | | | |
| | | 12 | | | | 57.0 | | | |
| | | 16 | | | | | | 57.0 | |
| | | 22 | | | | | | | 57.0 |
| | polyethylene glycol monobutyl ether | 4 | | | | | | | |
| | polyethylene glycol dimethyl ether | 4 | | | | | | | |
| | | 5 | | | | | | | |
| | | 11 | | | | | | | |
| | triethylene glycol butyl methyl ether | 3 | | | | | | | |
| | tripropylene glycol monobutyl ether | 3 | | | | | | | |
| | polypropylene glycol monomethyl ether | | | | | | | | |
| Ionization accelerator (part by mass) | SUNNOL NL-1430 *1 | | | 1.0 | 1.0 | 1.0 | 1.0 | 1.0 | 1.0 |
| | PELEX SS-H *2 | | | | | | | | |
| | CATIOGEN TML *3 | | | | | | | | |
| | ENAGICOL L-30B *4 | | | | | | | | |
| Water (part by mass) | | | | 2.0 | 2.0 | 2.0 | 2.0 | 2.0 | 2.0 |
| Ratio of water in fixing solution (% by mass) | | | | 2.7 | 2.7 | 2.7 | 2.7 | 2.7 | 2.7 |
| Evaluation | Solubilization | | | VG | VG | VG | VG | NG | NG |
| | Fixing property | | | VG | VG | VG | VG | — | — |
| | Paper curl | | | G | G | G | G | — | — |
| | Evaporation and storage stability | | | G | G | G | NG | — | — |
| | Odor | | | G | G | G | NG | — | — |
| | Overall evaluation | | | G | G | G | NG | NG | NG |
| Evaluation of sprayability | Sprayability | | | VG | VG | VG | VG | — | — |
| | Continuous sprayability | | | VG | VG | VG | G | — | — |

TABLE 2

| | | Number of carbon atoms of $R^1$ | Number of carbon atoms of $R^2$ | EX. 4 | EX. 5 | EX. 6 | EX. 7 | COM. EX. 4 | COM. EX. 5 | COM. EX. 6 |
|---|---|---|---|---|---|---|---|---|---|---|
| Aliphatic dicarboxylic acid ester (part by mass) | diethyl sebacate | 8 | 2 | 40.0 | 40.0 | 40.0 | 40.0 | 40.0 | 40.0 | 40.0 |
| | dibutyl sebacate | 8 | 4 | | | | | | | |
| | dioctyl sebacate | 8 | 8 | | | | | | | |
| | diethyl adipate | 4 | 2 | | | | | | | |
| | diisobutyl adipate | 4 | 4 | | | | | | | |
| | diethyl succinate | 2 | 2 | | | | | | | |
| Solubilizing agent (part by mass) | | Number of oxyalkylene unit | | | | | | | | |
| | triethylene glycol monomethyl ether | 3 | | | | | | | | |
| | polyethylene glycol monomethyl ether | 4 | | | | | | | | |
| | | 8 | | | | | | | | |
| | | 12 | | | | | | | | |
| | | 16 | | | | | | | | |
| | | 22 | | | | | | | | |
| | polyethylene glycol monobutyl ether | 4 | | 57.0 | | | | | | |
| | polyethylene glycol dimethyl ether | 4 | | | 57.0 | | | | | |
| | | 5 | | | | 57.0 | | | | |
| | | 11 | | | | | 57.0 | | | |
| | triethylene glycol butyl methyl ether | 3 | | | | | | 57.0 | | |
| | tripropylene glycol monobutyl ether | 3 | | | | | | | 57.0 | |
| | polypropylene glycol monomethyl ether | | | | | | | | | 57.0 |
| Ionization accelerator (part by mass) | SUNNOL NL-1430 *1 | | | 1.0 | 1.0 | 1.0 | 1.0 | 1.0 | 1.0 | 1.0 |
| | PELEX SS-H *2 | | | | | | | | | |
| | CATIOGEN TML *3 | | | | | | | | | |
| | ENAGICOL L-30B *4 | | | | | | | | | |
| Water (part by mass) | | | | 2.0 | 2.0 | 2.0 | 2.0 | 2.0 | 2.0 | 2.0 |
| Ratio of water in fixing solution (% by mass ) | | | | 2.7 | 2.7 | 2.7 | 2.7 | 2.7 | 2.7 | 2.7 |
| Evaluation | Solubilization | | | VG | VG | VG | VG | NG | NG | NG |
| | Fixing property | | | VG | VG | VG | VG | — | — | — |
| | Paper curl | | | G | G | G | G | — | — | — |
| | Evaporation and storage stability | | | G | G | G | G | — | — | — |
| | Odor | | | G | G | G | G | — | — | — |
| | Overall evaluation | | | G | G | G | G | NG | NG | NG |
| Evaluation of sprayability | Sprayability | | | VG | VG | VG | VG | — | — | — |
| | Continuous sprayability | | | VG | VG | VG | VG | — | — | — |

TABLE 3

| | | Number of carbon atoms of $R^1$ | Number of carbon atoms of $R^2$ | EX. 8 | EX. 9 | EX. 10 | EX. 11 | EX. 12 |
|---|---|---|---|---|---|---|---|---|
| Aliphatic dicarboxylic acid ester (part by mass) | diethyl sebacate | 8 | 2 | | | | | |
| | dibutyl sebacate | 8 | 4 | 40.0 | | | | |
| | dioctyl sebacate | 8 | 8 | | 40.0 | | | |
| | diethyl adipate | 4 | 2 | | | 40.0 | | |
| | diisobutyl adipate | 4 | 4 | | | | 40.0 | |
| | diethyl succinate | 2 | 2 | | | | | 40.0 |
| Solubilizing agent (part by mass) | | Number of oxyalkylene unit | | | | | | |
| | triethylene glycol monomethyl ether | 3 | | | | | | |
| | polyethylene glycol monomethyl ether | 4 | | 57.0 | 57.0 | 57.0 | 57.0 | 57.0 |
| | | 8 | | | | | | |
| | | 12 | | | | | | |
| | | 16 | | | | | | |
| | | 22 | | | | | | |
| | polyethylene glycol monobutyl ether | 4 | | | | | | |
| | polyethylene glycol dimethyl ether | 4 | | | | | | |
| | | 5 | | | | | | |
| | | 11 | | | | | | |
| | triethylene glycol butyl methyl ether | 3 | | | | | | |
| | tripropylene glycol monobutyl ether | 3 | | | | | | |
| | polypropylene glycol monomethyl ether | | | | | | | |
| Ionization accelerator (part by mass) | SUNNOL NL-1430 *1 | | | 1.0 | 1.0 | 1.0 | 1.0 | 1.0 |
| | PELEX SS-H *2 | | | | | | | |
| | CATIOGEN TML *3 | | | | | | | |
| | ENAGICOL L-30B *4 | | | | | | | |
| Water (part by mass) | | | | 2.0 | 2.0 | 2.0 | 2.0 | 2.0 |
| Ratio of water in fixing solution (% by mass) | | | | 2.7 | 2.7 | 2.7 | 2.7 | 2.7 |
| Evaluation | Solubilization | | | VG | VG | VG | VG | VG |
| | Fixing property | | | VG | VG | VG | VG | VG |
| | Paper curl | | | G | G | G | G | G |
| | Evaporation and storage stability | | | G | G | G | G | G |
| | Odor | | | G | G | G | G | G |
| | Overall evaluation | | | G | G | G | G | G |
| Evaluation of sprayability | Sprayability | | | VG | VG | VG | VG | VG |
| | Continuous sprayability | | | VG | VG | VG | VG | VG |

TABLE 4

| | | Number of carbon atoms of $R^1$ | Number of carbon atoms of $R^2$ | EX. 13 | EX. 14 | EX. 15 | EX. 16 | EX. 17 |
|---|---|---|---|---|---|---|---|---|
| Aliphatic dicarboxylic acid ester (part by mass) | diethyl sebacate | 8 | 2 | 90.0 | 70.0 | 60.0 | 20.0 | 10.0 |
| | dibutyl sebacate | 8 | 4 | | | | | |
| | dioctyl sebacate | 8 | 8 | | | | | |
| | diethyl adipate | 4 | 2 | | | | | |
| | diisobutyl adipate | 4 | 4 | | | | | |
| | diethyl succinate | 2 | 2 | | | | | |
| Solubilizing agent (part by mass) | | Number of oxyalkylene unit | | | | | | |
| | triethylene glycol monomethyl ether | 3 | | | | | | |
| | polyethylene glycol monomethyl ether | 4 | | 9.4 | 27.0 | 37.0 | 77.0 | 87.0 |
| | | 8 | | | | | | |
| | | 12 | | | | | | |
| | | 16 | | | | | | |
| | | 22 | | | | | | |
| | polyethylene glycol monobutyl ether | 4 | | | | | | |
| | polyethylene glycol dimethyl ether | 4 | | | | | | |
| | | 5 | | | | | | |
| | | 11 | | | | | | |
| | triethylene glycol butyl methyl ether | 3 | | | | | | |
| | tripropylene glycol monobutyl ether | 3 | | | | | | |
| | polypropylene glycol monomethyl ether | | | | | | | |
| Ionization accelerator (part by mass) | SUNNOL NL-1430 *1 | | | 0.2 | 1.0 | 1.0 | 1.0 | 1.0 |
| | PELEX SS-H*2 | | | | | | | |
| | CAWGEN TML *3 | | | | | | | |
| | ENAGICOL L-30B *4 | | | | | | | |
| Water (part by mass) | | | | 0.4 | 2.0 | 2.0 | 2.0 | 2.0 |
| Ratio of water in fixing solution (% by mass) | | | | 0.5 | 2.7 | 2.7 | 2.7 | 2.7 |
| Evaluation | Solubilization | | | G | VG | VG | VG | VG |
| | Fixing property | | | G | VG | VG | VG | G |
| | Paper curl | | | G | G | G | G | G |

TABLE 4-continued

| | | Number of carbon atoms of $R^1$ | Number of carbon atoms of $R^2$ | EX. 13 | EX. 14 | EX. 15 | EX. 16 | EX. 17 |
|---|---|---|---|---|---|---|---|---|
| | Evaporation and storage stability | | | G | G | G | G | G |
| | Odor | | | G | G | G | G | G |
| | Overall evaluation | | | G | G | G | G | G |
| Evaluation of sprayability | Sprayability | | | G | VG | VG | VG | VG |
| | Continuous sprayability | | | G | VG | VG | VG | VG |

TABLE 5

| | | Number of carbon atoms of $R^1$ | Number of carbon atoms of $R^2$ | EX. 18 | EX. 19 | EX. 20 | EX. 21 |
|---|---|---|---|---|---|---|---|
| Aliphatic dicarboxylic acid ester (part by mass) | diethyl sebacate | 8 | 2 | 40.0 | 40.0 | 40.0 | 40.0 |
| | dibutyl sebacate | 8 | 4 | | | | |
| | dioctyl sebacate | 8 | 8 | | | | |
| | diethyl adipate | 4 | 2 | | | | |
| | diisobutyl adipate | 4 | 4 | | | | |
| | diethyl succinate | 2 | 2 | | | | |
| Solubilizing agent (part by mass) | | Number of oxyalkylene unit | | | | | |
| | triethylene glycol monomethyl ether | 3 | | | | | |
| | polyethylene glycol monomethyl ether | 4 | | 57.0 | 57.0 | 57.0 | 57.0 |
| | | 8 | | | | | |
| | | 12 | | | | | |
| | | 16 | | | | | |
| | | 22 | | | | | |
| | polyethylene glycol monobutyl ether | 4 | | | | | |
| | polyethylene glycol dimethyl ether | 4 | | | | | |
| | | 5 | | | | | |
| | | 11 | | | | | |
| | triethylene glycol butyl methyl ether | 3 | | | | | |
| | tripropylene glycol monobutyl ether | 3 | | | | | |
| | polypropylene glycol monomethyl ether | | | | | | |
| Ionization accelerator (part by mass) | SUNNOL NL-1430 *1 | | | | | | |
| | PELEX SS-H *2 | | | 1.0 | | | |
| | CATIOGEN TML *3 | | | | 1.0 | | |
| | ENAGICOL L-30B *4 | | | | | 1.0 | |
| Water (part by mass) | | | | 2.0 | 2.0 | 2.0 | 3.0 |
| Ratio of water in fixing solution (% by mass) | | | | 2.0 | 2.0 | 2.0 | 3.0 |
| Evaluation | Solubilization | | | VG | VG | VG | VG |
| | Fixing property | | | VG | VG | VG | G |
| | Paper curl | | | G | G | G | G |
| | Evaporation and storage stability | | | G | G | G | G |
| | Odor | | | G | G | G | G |
| | Overall evaluation | | | G | G | G | G |
| Evaluation of sprayability | Sprayability | | | VG | VG | VG | NG |
| | Continuous sprayability | | | G | G | G | NG |

TABLE 6

| | | Number of carbon atoms of $R^1$ | Number of carbon atoms of $R^2$ | EX. 22 | EX. 23 | EX. 24 | EX. 25 | EX. 26 |
|---|---|---|---|---|---|---|---|---|
| Aliphatic dicarboxylic acid ester (part by mass) | diethyl sebacate | 8 | 2 | 20.0 | 20.0 | 20.0 | 20.0 | 20.0 |
| | dibutyl sebacate | 8 | 4 | | | | | |
| | dioctyl sebacate | 8 | 8 | | | | | |
| | diethyl adipate | 4 | 2 | | | | | |
| | diisobutyl adipate | 4 | 4 | | | | | |
| | diethyl succinate | 2 | 2 | | | | | |
| Solubilizing agent (part by mass) | | Number of oxyalkylene unit | | | | | | |
| | triethylene glycol monomethyl ether | 3 | | | | | | |
| | polyethylene glycol monomethyl ether | 4 | | 77.8 | 75.8 | 73.8 | 71.8 | 69.8 |
| | | 8 | | | | | | |
| | | 12 | | | | | | |
| | | 16 | | | | | | |
| | | 22 | | | | | | |

TABLE 6-continued

| | | Number of carbon atoms of $R^1$ | Number of carbon atoms of $R^2$ | EX. 22 | EX. 23 | EX. 24 | EX. 25 | EX. 26 |
|---|---|---|---|---|---|---|---|---|
| | polyethylene glycol monobutyl ether | 4 | | | | | | |
| | polyethylene glycol dimethyl ether | 4 | | | | | | |
| | | 5 | | | | | | |
| | | 11 | | | | | | |
| | triethylene glycol butyl methyl ether | 3 | | | | | | |
| | tripropylene glycol monobutyl ether | 3 | | | | | | |
| | polypropylene glycol monomethyl ether | | | | | | | |
| Ionization accelerator (part by mass) | SUNNOL NL-1430 *1 | | | 0.7 | 0.7 | 0.7 | 0.7 | 0.7 |
| | PELEX SS-H *2 | | | | | | | |
| | CATIOGEN TML *3 | | | | | | | |
| | ENAGICOL L-30B *4 | | | | | | | |
| Water (part by mass) | | | | 1.5 | 3.5 | 5.5 | 7.5 | 9.5 |
| Ratio of water in fixing solution (% by mass) | | | | 2.0 | 4.0 | 6.0 | 8.0 | 10.0 |
| Evaluation | Solubilization | | | VG | VG | VG | VG | G |
| | Fixing property | | | VG | VG | VG | VG | VG |
| | Paper curl | | | G | G | G | G | G |
| | Evaporation and storage stability | | | G | G | G | G | G |
| | Odor | | | G | G | G | G | G |
| | Overall evaluation | | | G | G | G | G | G |
| Evaluation of sprayability | Sprayability | | | VG | VG | VG | VG | VG |
| | Continuous sprayability | | | VG | VG | VG | VG | VG |

REFERENCE SIGNS LIST

5: fixing device

The invention claimed is:

1. A fixing solution comprising:

an aliphatic dicarboxylic acid ester;

a polyethylene glycol alkyl ether; and water dispersed in the aliphatic dicarboxylic acid ester, wherein the polyethylene glycol alkyl ether has not less than 4 pieces and less than 10 pieces of an oxyethylene unit; and wherein a number of a carbon atom of an alkyl group of the polyethylene glycol alkyl ether is not less than 1 and is not more than 4.

2. The fixing solution according to claim 1, wherein the water is solubilized in the aliphatic dicarboxylic acid ester by the polyethylene glycol alkyl ether.

3. The fixing solution according to claim 1, wherein the aliphatic dicarboxylic acid ester is represented by a general formula: $R^1$ (—COO—$R^2$)$_2$ (in the general formula, $R^1$ being an alkylene group having 1 to 8 carbon atoms and $R^2$ being an alkyl group having 2 to 10 carbon atoms).

4. The fixing solution according to claim 1, wherein a ratio of the water in the fixing solution is not more than 10% by mass.

5. The fixing solution according to claim 1, wherein a ratio of the water in the fixing solution is not less than 0.1% by mass and is not more than 10% by mass.

6. The fixing solution according to claim 1, wherein a ratio of the aliphatic dicarboxylic acid ester in the fixing solution is not less than 10% by mass and is not more than 90% by mass.

7. The fixing solution according to claim 1, wherein a mass ratio of the polyethylene glycol alkyl ether to the aliphatic dicarboxylic acid ester is not less than 9.4/90 and is not more than 87/10.

8. The fixing solution according to claim 1, wherein a mass ratio of the polyethylene glycol alkyl ether to the aliphatic dicarboxylic acid ester is not less than 27/70 and is not more than 77/20.

9. The fixing solution according to claim 1, further comprising an ionization accelerator for promoting ionization of the fixing solution.

10. The fixing solution according to claim 9, wherein the ionization accelerator is an ionic surfactant.

11. The fixing solution according to claim 10, wherein the ionic surfactant is an anionic surfactant.

12. The fixing solution according to claim 11, wherein the anionic surfactant is a sulfuric acid ester salt.

13. The fixing solution according to claim 12, wherein the sulfuric acid ester salt is a sodium polyoxyethylene alkyl ether sulfate.

14. The fixing solution according to claim 11, wherein the anionic surfactant is a sulfonic acid salt.

15. The fixing solution according to claim 10, wherein the ionic surfactant is a cationic surfactant.

16. The fixing solution according to claim 15, wherein the cationic surfactant is an ammonium salt.

17. The fixing solution according to claim 10, wherein the ionic surfactant is an amphoteric surfactant.

18. The fixing solution according to claim 17, wherein the amphoteric surfactant is of a betaine type.

19. The fixing solution according to claim 1, wherein the fixing solution is used in a fixing apparatus of an electrostatic spraying system.

* * * * *